(12) United States Patent
Koyagi et al.

(10) Patent No.: US 7,216,551 B2
(45) Date of Patent: May 15, 2007

(54) ROLLING BEARING UNIT WITH SENSOR

(75) Inventors: Katsura Koyagi, Kashiwara (JP);
Masahiro Inoue, Nara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 10/544,768

(22) PCT Filed: Feb. 6, 2004

(86) PCT No.: PCT/JP2004/001242

§ 371 (c)(1),
(2), (4) Date: Aug. 8, 2005

(87) PCT Pub. No.: WO2004/076873

PCT Pub. Date: Sep. 10, 2004

(65) Prior Publication Data

US 2006/0061352 A1    Mar. 23, 2006

(30) Foreign Application Priority Data

Feb. 7, 2003  (JP)  ............................. 2003-031107
Feb. 7, 2003  (JP)  ............................. 2003-031126

(51) Int. Cl.
*G01L 3/14*  (2006.01)
(52) U.S. Cl. ................................. 73/862.322
(58) Field of Classification Search .......... 73/862.322; 701/70; 324/173; 384/448
See application file for complete search history.

(56) References Cited

U.S. PATENT DOCUMENTS 2,922,681 A *   1/1960  Bayre ......................... 384/446
5,140,849 A *   8/1992  Fujita et al. ................... 73/593
5,603,575 A *   2/1997  Ouchi ......................... 384/446
5,779,368 A *   7/1998  Morita et al. ............... 384/448
6,375,359 B1*   4/2002  Miyazaki .................... 384/448
6,471,407 B1   10/2002  Katano
6,687,623 B2*   2/2004  Bailey et al. ................. 702/42
6,920,801 B2*   7/2005  Van Leeuwen et al. .. 73/862.49
7,057,319 B2*   6/2006  Yamada ..................... 310/90.5

FOREIGN PATENT DOCUMENTS

| DE | 101 36 438 A1 | 3/2002 |
| EP | 0 395 783 A1 | 11/1990 |
| EP | 0 432 122 A2 | 6/1991 |
| EP | 0 726 468 A1 | 8/1996 |
| EP | 0 821 240 A1 | 1/1998 |

(Continued)

OTHER PUBLICATIONS

Patent Abstracts of Japan, JP 03-209016, Sep. 12, 1991.

*Primary Examiner*—Michael Cygan
*Assistant Examiner*—O. Davis
(74) *Attorney, Agent, or Firm*—Oblon, Spivak, McClelland, Maier & Neustadt, P.C.

(57) ABSTRACT

A sensor device 2 has a magnetostrictive sensor 8 provided on a fixed-side raceway member 3 for detecting a gap between the sensor and a rotation-side raceway member 4, and means for processing the output of the magnetostrictive sensor 8. The processing means comprises a rotation detecting unit for determining the speed of rotation of the rotation-side raceway member 4 from the number of repetitions of a variation in the output of the magnetostrictive sensor 8, a unit for averaging output values of the magnetostrictive sensor 8 and a load calculating unit for determining the load acting on an antifriction bearing from the output averaged by the averaging unit.

7 Claims, 6 Drawing Sheets

FOREIGN PATENT DOCUMENTS

| | | |
|---|---|---|
| EP | 0 838 683 A1 | 4/1998 |
| EP | 0 875 683 A1 | 11/1998 |
| EP | 0 892 262 A2 | 1/1999 |
| EP | 1 518 769 A1 | 3/2005 |
| EP | 1 550 813 A1 | 7/2005 |
| FR | 2 820 336 A1 | 8/2002 |
| JP | 52-20055 | 2/1977 |
| JP | 1-206113 | 8/1989 |
| JP | 23204/1995 | 4/1995 |
| JP | 9-174384 | 7/1997 |
| JP | 11-174069 | 7/1999 |
| JP | 11-218542 | 8/1999 |
| JP | 2001-21577 | 1/2001 |
| JP | 2001-33322 | 2/2001 |
| JP | 2002-385012 | 12/2002 |
| JP | 2004-3918 | 1/2004 |

\* cited by examiner (a)

(b)

ROLLING BEARING UNIT WITH SENSOR

TECHNICAL FIELD

The present invention relates to sensor-equipped antifriction bearing units comprising an antifriction bearing and a sensor device attached to the bearing for detecting various items of data as to the bearing.

BACKGROUND ART

Antifriction bearing units are already known which comprise an antifriction bearing, and a sensor device and a member to be detected, the sensor device and the member to be detected being mounted on the bearing. Such units are used in railroad cars and motor vehicles for supporting an axle or a rotating shaft for transmitting rotation to the axle and for detecting the rotation, i.e., the speed of rotation of the axle or shaft or the angle of rotation thereof.

The publication of JP-U No. 6-47867 discloses such a sensor-equipped antifriction bearing unit comprising a sensor device which is a rotational speed sensor of the electromagnetic induction type and a member to be detected which is in the form of an annular member (pulser ring) having a specified shape and projections. Further the publication of JP-A No. 11-174069 discloses such a sensor-equipped antifriction bearing unit comprising a sensor device which is a magnetic sensor, and a member to be detected which is an annular magnet (magnetized pulser) having N poles and S poles spaced equidistantly.

Since various items of data are required for controlling motor vehicles, it has been proposed to provide a sensor device on a hub unit comprising a rotation-side raceway member for a wheel to be attached thereto, a fixed-side raceway member to be fixed to the body of the vehicle, and two rows of rolling bodies arranged between the two raceway members. For example, the publication of JP-A No. 3-209016 discloses a sensor-equipped hub unit wherein an annular support member is attached to the inner end face of a fixed-side raceway member and provided with a strain sensor.

With the sensor-equipped antifriction bearing units disclosed in the first- and second-mentioned publications, the rotation-side raceway member needs to have attached thereto the member to be detected although the two units are different as to the presence or absence of magnetic poles. The units therefore have the problem of necessitating an increased number of assembling steps and a larger number of components to result in a higher cost.

In recent years, furthermore, the control means in use for motor vehicles include drive force control means not permitting spinning of the drive wheels when the vehicle is started or accelerated, and braking force control means for suppressing lateral skidding for cornering, in addition to the ABS (antilock brake system) control means. To ensure more accurate control, it has become important to detect data which is usable effectively for these modes of control. However, the sensor-equipped hub unit disclosed in the third-mentioned publication has the problem that since the strain of the annular support member is measured, a great error is involved in determining the ground contact load from the strain measured, consequently making it impossible to calculate the ground contact load accurately from the measurement of the strain sensor.

SUMMARY OF THE INVENTION

An object of the present invention is to provide a sensor-equipped antifriction bearing unit which is adapted to detect the speed of rotation by a simple construction without necessitating the member to be detected which is conventionally needed.

Another object of the invention is to provide a sensor-equipped antifriction bearing unit which is adapted to accurately determine the load acting on the bearing by a simple construction and which is also adapted to detect the speed of rotation of the rotation-side raceway member of the bearing, so that when the bearing unit is used as a hub unit in motor vehicles, the ground contact load and the rotational speed of the wheel can be determined with high accuracy by the simple construction.

DISCLOSURE OF THE INVENTION

The present invention provides a sensor-equipped antifriction bearing unit comprising an antifriction bearing having a fixed-side raceway member, a rotation-side raceway member and rolling bodies arranged between the two members, and a sensor device provided on the antifriction bearing, the antifriction bearing unit being characterized in that the sensor device has a magnetostrictive sensor provided on the fixed-side raceway member for detecting a gap between the sensor and the rotation-side raceway member, and means for processing the output of the magnetostrictive sensor, the processing means comprising a rotation detecting unit for determining the speed of rotation of the rotation-side raceway member from the number of repetitions of a variation in the output of the magnetostrictive sensor.

The sensor-equipped antifriction bearing unit of the present invention is suitable for use as a hub unit in motor vehicles and is usable also for bearing portions in motors and the like for supporting the rotating body thereof.

The gap formed between the sensor and the peripheral surface of the rotation-side raceway member varies cyclically every turn of rotation, and the speed of rotation of the rotation-side raceway member of the antifriction bearing can be determined by using the number of repetitions of the variation in the gap.

The gap is created, for example, by the eccentricity of the rotation-side raceway member. The eccentricity of the rotation-side raceway member can be obtained by machining the periphery of the raceway member partly or entirely in the form of an eccentric cylindrical surface, whereas since this member becomes eccentric relative to the fixed-side member when machined and assembled in the same manner as practiced usually, this eccentricity or misalignment is usable in place of the member to be detected, whereby the member to be detected can be dispensed with. Alternatively, bolts or the like projections arranged at equal intervals on the rotation-side raceway member or a bolt or the like projection provided at one location on the periphery thereof may be used to detect the distance to the projection as the gap to be detected.

The magnetostrictive sensor is adapted to measure a reverse magnetostrictive effect (the phenomenon that when a substance strains or deforms, a magnetic force is produced). Examples of magnetostrictive sensors are a magnetic impedance sensor (MI sensor) for measuring external magnetic fields utilizing the electromagnetic phenomenon that the impedance between opposite ends of a magnetic wire having a high magnetic permeability is altered by an external magnetic field when a high-frequency current is passed through the wire, and a stress impedance sensor (SI sensor) utilizing variations in impedance due to stress. For example, a displacement of 1 μm can be detected by the MI sensor as a voltage of 1 mV to 3 mV.

The rotation-side raceway member is made from a magnetic material such as a high carbon chromium bearing steel. The fixed-side raceway member and the rolling bodies may be of the same material as the rotation-side raceway member, while the rolling bodies may be made from a nonmagnetic material such as silicon nitride, silicon carbide or like ceramic material or nonmagnetic steel material so as not to affect the magnetic field when brought toward or away from the magnetostrictive sensor.

In the case where the magnetostrictive sensor is a magnetic impedance sensor, the rotation-side raceway member may be provided with an annular magnetized portion opposed to the sensor. Such a magnetized portion may be, for example, a rubber magnetic body which is so magnetized that N poles and S poles are arranged alternately at equal intervals, or a film bearing a row of magnetic ink marks printed thereon.

With the sensor-equipped antifriction bearing unit of the present invention, gap variations produced, for example, by the eccentricity of the rotation-side raceway member are detected by the magnetostrictive sensor. This obviates the need for the member to be detected, such as a pulser ring or magnetized pulser, for detecting rotation, consequently decreasing the number of assembling steps and the number of components to result in a cost reduction.

Preferably, the processing means further comprises a unit for averaging output values of the magnetostrictive sensor and a load calculating unit for determining the load acting on the antifriction bearing from the averaged output.

In the case where the sensor-equipped antifriction bearing unit is used as a hub unit in motor vehicles, the ground contact load on each tire varies with variations in the speed of the vehicle or with alterations in the posture thereof during running. At this time, the gap created between the rotation-side raceway member and the fixed-side raceway member varies with the ground contact load. The variations in the gap alter the magnetic field in the vicinity of the magnetostrictive sensor, and the alterations of the magnetic field can be measured by the magnetostrictive sensor in terms of magnetostrictive variations. Variations in the load acting on the bearing or in the ground contact load on the tire can be calculated backward from the magnetostrictive variations based on the relationship established in advance between the magnetostrictive variation and the load on the bearing or ground contact load on the tire.

With the sensor-equipped antifriction bearing unit having the processing means which comprises a unit for averaging the output values of the magnetostrictive sensor, and a load calculating unit for determining the load from the averaged output, the gap between the rotation-side raceway member and the fixed-side raceway member is detected by the magnetostrictive sensor, and the output of the sensor, i.e., voltage values output therefrom, are averaged. This ensures proportional relationship between the voltage average and the load acting on the bearing, with the result that the load on the bearing can be determined from the output of the magnetostrictive sensor with high accuracy.

Accordingly, when the sensor-equipped antifriction bearing unit is used for the hub unit of motor vehicles, the force exerted by the ground on the rotation-side raceway member, i.e., ground contact load, can be detected with high accuracy from the gap between the rotation-side raceway member and the fixed-side raceway member. The ground contact load on the tire thus obtained is used as data substituting for the slip ratio in ABS control and is useful also for drive force control and braking force control, contributing to the improvement of accuracy of vehicle control. Because the bearing unit has the rotation detecting unit for determining the speed of rotation of the rotation-side raceway member from the number of repetitions of the variation in the output of the magnetostrictive sensor, the number of revolutions of the wheel or the rotational speed thereof can be detected from the number of repetitions of the variation in the gap, in addition to the ground contact load on the tire. Thus, two kinds of important vehicle control data can be obtained by using one sensor.

The fixed-side raceway member is an outer ring having a mount portion to be fastened to a vehicle body, and the rotation-side raceway member comprises an inner shaft for a wheel to be attached thereto and an inner ring fitted around the inner shaft. The magnetostrictive sensor may be fixed to an end portion of the fixed-side raceway member so as to be opposed to an outer periphery of the inner ring. The sensor-equipped antifriction bearing unit thus constructed is suitable for use as a sensor-equipped hub unit in motor vehicles.

When the bearing unit is to be used as the sensor-equipped hub unit, the magnetostrictive sensor may be so provided as to be opposed to an outer periphery of a crimp portion for preventing the inner ring from slipping off, or as to be opposed to an outer periphery of the inner shaft. When the sensor is fixed to the end portion of the fixed-side raceway member so as to be opposed to the outer periphery of the inner ring, a signal line from the sensor can be let out from the end portion of the fixed-side raceway member. This renders the bearing unit easy to assemble. The magnetostrictive sensor can be attached to the fixed-side raceway member easily for example, by embedding the sensor in a resin and joining the resin to the fixed-side raceway member or to a cover or the like fixed to this member.

BEST MODE OF CARRYING OUT THE INVENTION

Embodiments of the invention will be described below with reference to the drawings.

Figure 1:
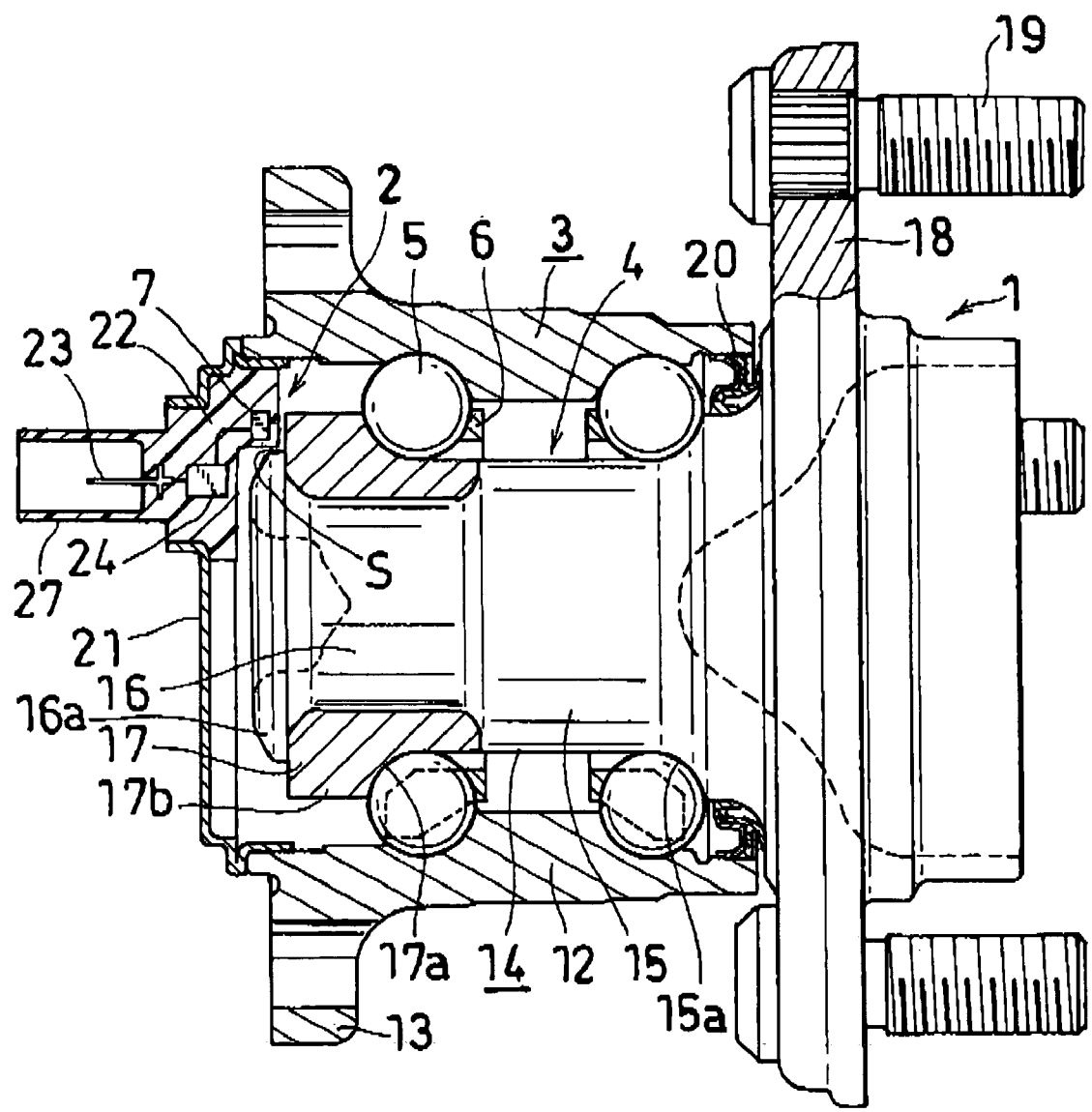
FIG. 1 is a view in vertical section showing a first embodiment of sensor-equipped antifriction bearing unit according to the invention.

FIG. 1 shows a first embodiment of sensor-equipped antifriction bearing unit of the invention. In the following description, the terms "left," "right," "upper" and "lower" refer respectively to the left- and right-hand sides and the upper and lower sides of FIGS. 1 to 3. Incidentally, the left-hand side of these drawings is the inside of the vehicle and the right-hand side thereof the outside of the vehicle.

As shown in FIG. 1, the sensor-equipped antifriction bearing unit comprises a hub unit 1 serving as an antifriction bearing, and a sensor device 2 for detecting the rotation thereof and ground contact loads.

The hub unit 1 comprises a fixed-side raceway member 3 fixed to a vehicle body, a rotation-side raceway member 4 for a wheel to be attached to, balls 5 serving as rolling bodies arranged in two rows between the two members 3, 4, and retainers 6 for holding the balls 5 in the respective rows.

The fixed-side raceway member 3 has a hollow cylindrical portion 12 provided with two outer ring raceways on the inner periphery thereof, and a flange portion 13 provided in the vicinity of the left end of the cylindrical portion 12 and to be fastened with bolts to a suspension device (vehicle body).

The rotation-side raceway member 4 comprises an inner shaft 14 composed of a large-diameter portion 15 having a first raceway 15a, and a small-diameter portion 16 having an outside diameter smaller than the diameter of the first raceway 15a; and an inner ring 17 fixedly fitted around the small-diameter portion 16 of the inner shaft 14 and having a right face in Intimate contact with a left face of the large-diameter portion 15 of the shaft 14. The inner shaft 14 has a flange 18 positioned close to the right end thereof and fixedly provided with bolts 19 for attaching a wheel. The inner ring 17 has a raceway 17a formed in its right portion and in parallel to the raceway 15a of the shaft 14. The ring 17 has a shoulder 17b at its left portion. A seal device 20 is provided between the right end of the fixed-side raceway member 3 and the inner shaft 14. A cover 21 is fixedly provided over the left end of the fixed-side raceway member 3.

Figure 7:
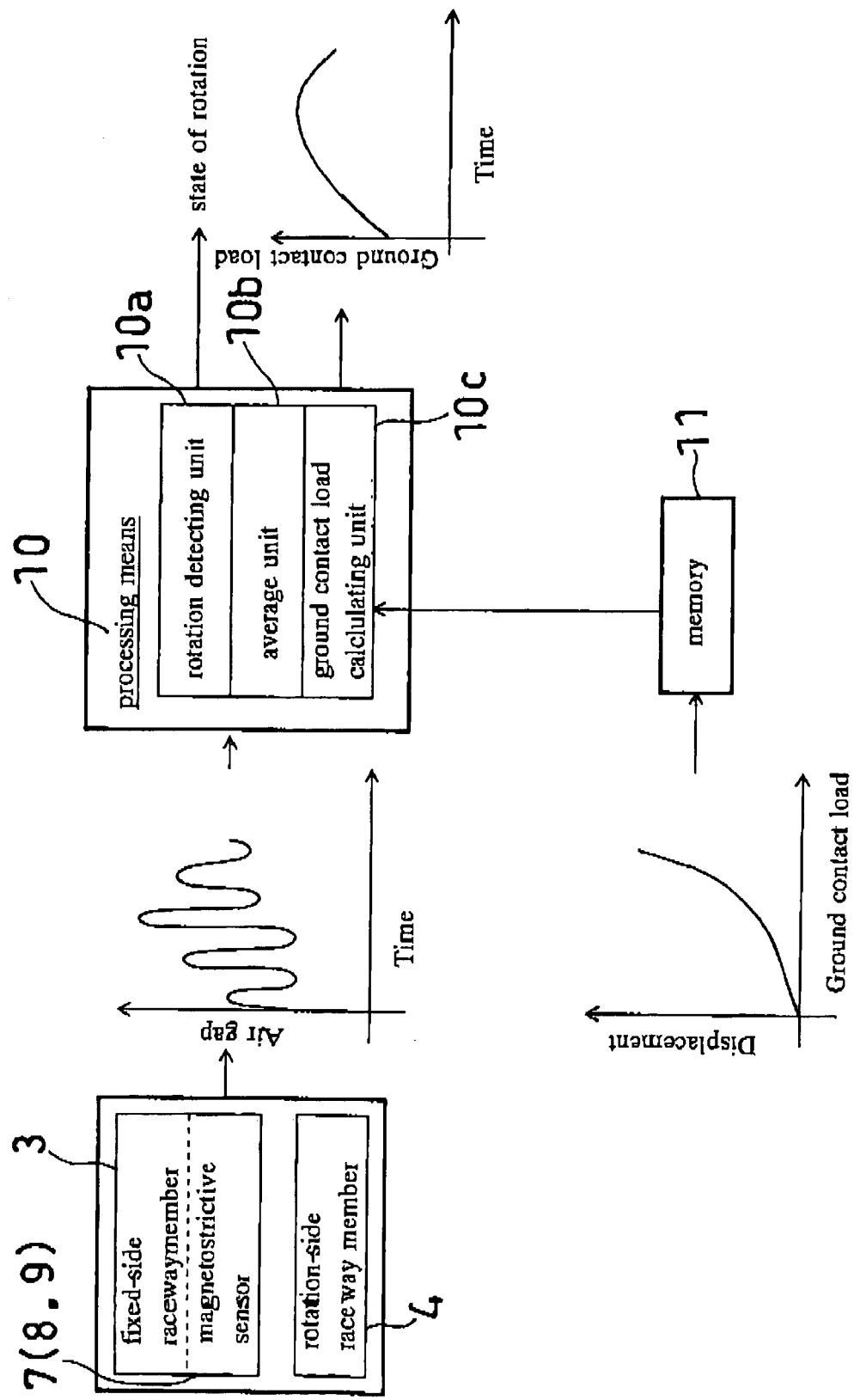
FIG. 7 is a block diagram showing a sensor device for use in the first to third embodiments of sensor-equipped antifriction bearing units of the invention.

The sensor device 2 comprises a magnetostrictive sensor 7 attached to the fixed-side raceway member 3, and processing means 10 (not appearing in FIG. 1, see FIG. 7) for processing the output of the magnetostrictive sensor 7. As shown in FIG. 7, the processing means 10 comprises a rotation detecting unit 10a for determining the rotational speed of the rotation-side raceway member 4 from the number of repetitions of a variation in the output of the sensor 7, an averaging unit 10b for averaging the output values of the sensor 7, and a load calculating unit 10c for calculating the load acting on the hub unit 1 from the averaged output obtained by the averaging unit 10b. When the magnetostrictive sensor 7 is a magnetic impedance sensor, the processing means 10 includes a magnetic impedance (MI) element and an oscillation circuit for supplying high-frequency current to the MI element, and may further include a detection signal amplifying circuit.

Figure 4:
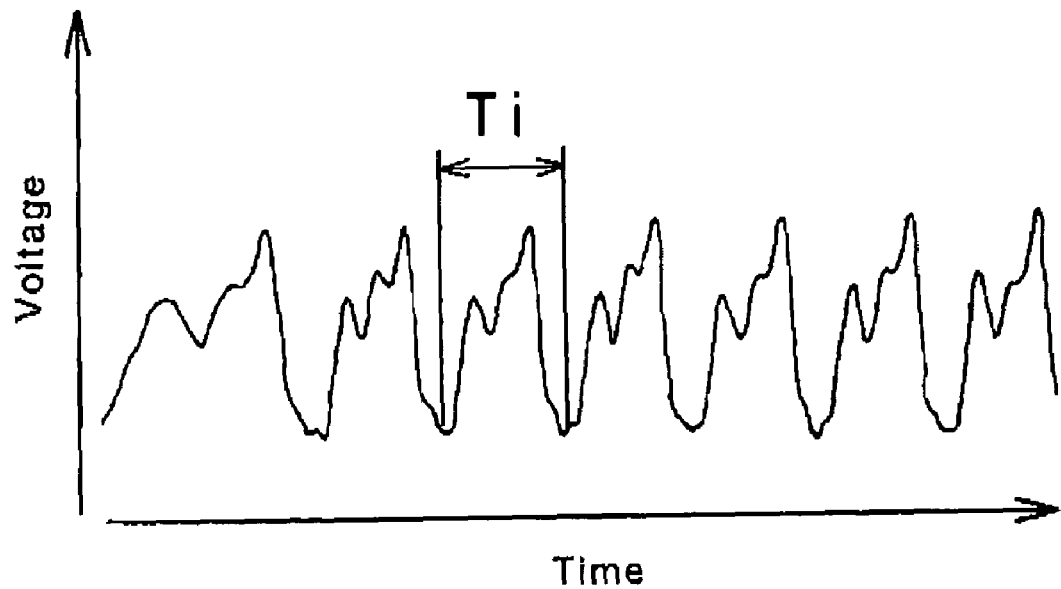
FIG. 4 includes graphs each showing an example of output of a magnetostrictive sensor, (a) showing the output during forward rotation, (b) showing the output during reverse rotation.
Figure 4:
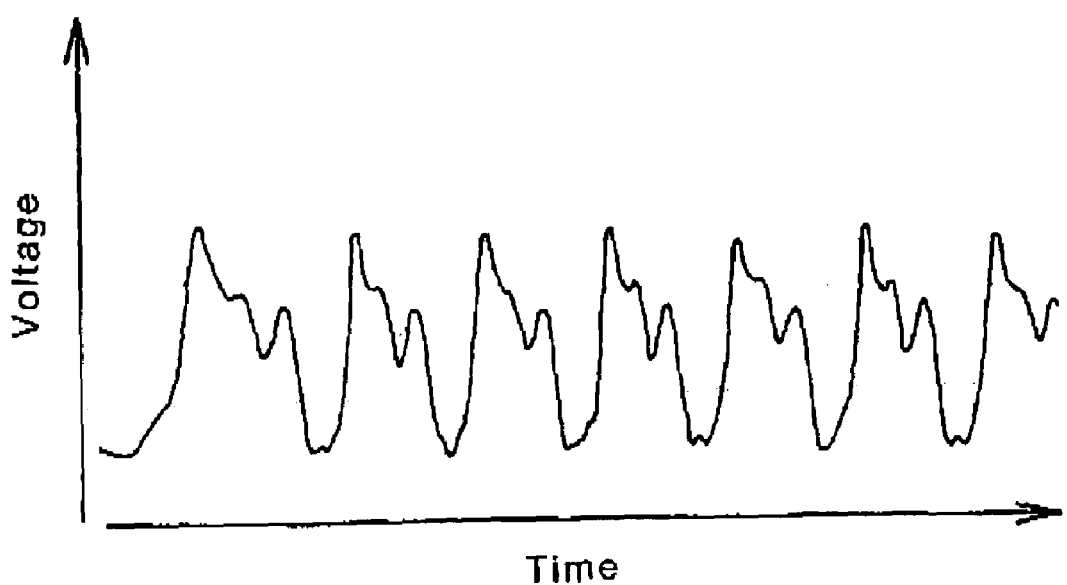

According to the present embodiment, the magnetostrictive sensor 7 is a magnetic impedance sensor and is embedded in a resin (22) inside the cover 21 which is made of a metal. The sensor 7 is provided at an end thereof with a sensor face opposed to a crimp portion 16a provided at the left end of the small-diameter portion 16 of the inner shaft 14 for preventing the inner ring 17 from slipping off. A connector portion 27 is molded integrally with the resin 22 for attaching thereto a harness for connecting the sensor device 2 to the processing means 10 which is provided on the vehicle body. The connector portion 27 is provided with a connector pin 23 for signals, and the magnetostrictive sensor 7 is connected to the connector pin 23 by a connector 24 and lead wire (or by a lead wire only). The sensor face of the sensor 7 is opposed to the outer periphery of the crimp portion 16a with a radial gap S provided therebetween. The center axis of the rotation-side raceway member 4 is slightly out of alignment with the center axis of the fixed-side raceway member 3 (for example, owing to misalignment due to an error involved in fabrication), with the result that the radial width of the gap S varies with the rotation of the rotation-side raceway member 4. As shown in FIG. 4, the magnetostrictive sensor 7 produces voltage values in accordance with the radial width of the gap S. Indicated at Ti in the drawing is the rotation cycle of the rotation-side raceway member 4, and the gap S varies cyclically every turn of rotation. The voltage output is detectable not only during forward rotation as shown in FIG. 4(a) but also during reverse rotation as shown in FIG. 4(b). Accordingly, the speed of rotation can be determined from the output of the magnetostrictive sensor 7.

Figure 5:
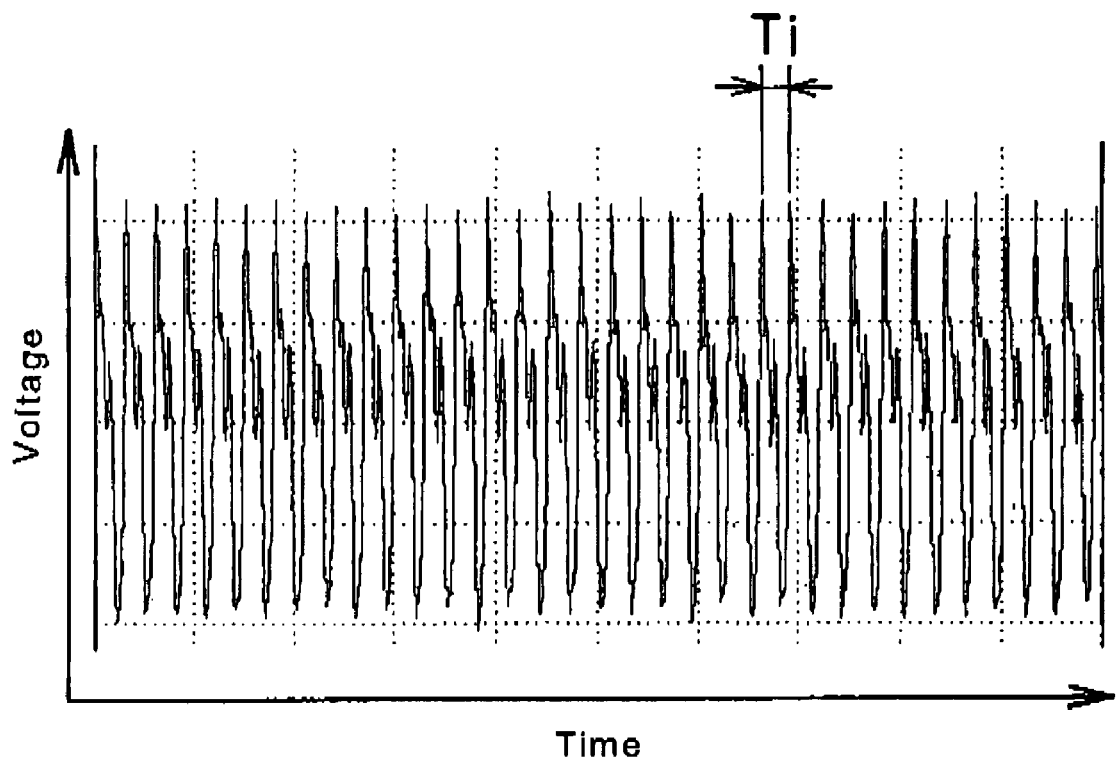
FIG. 5 is a diagram showing examples of output value measurements of the magnetostrictive sensor.

The width of the gap S varies with the ground contact load of the tire, and the magnetostrictive sensor 7 outputs variations in the ground contact load on the tire as voltage value variations as shown in FIG. 5.

Figure 2:
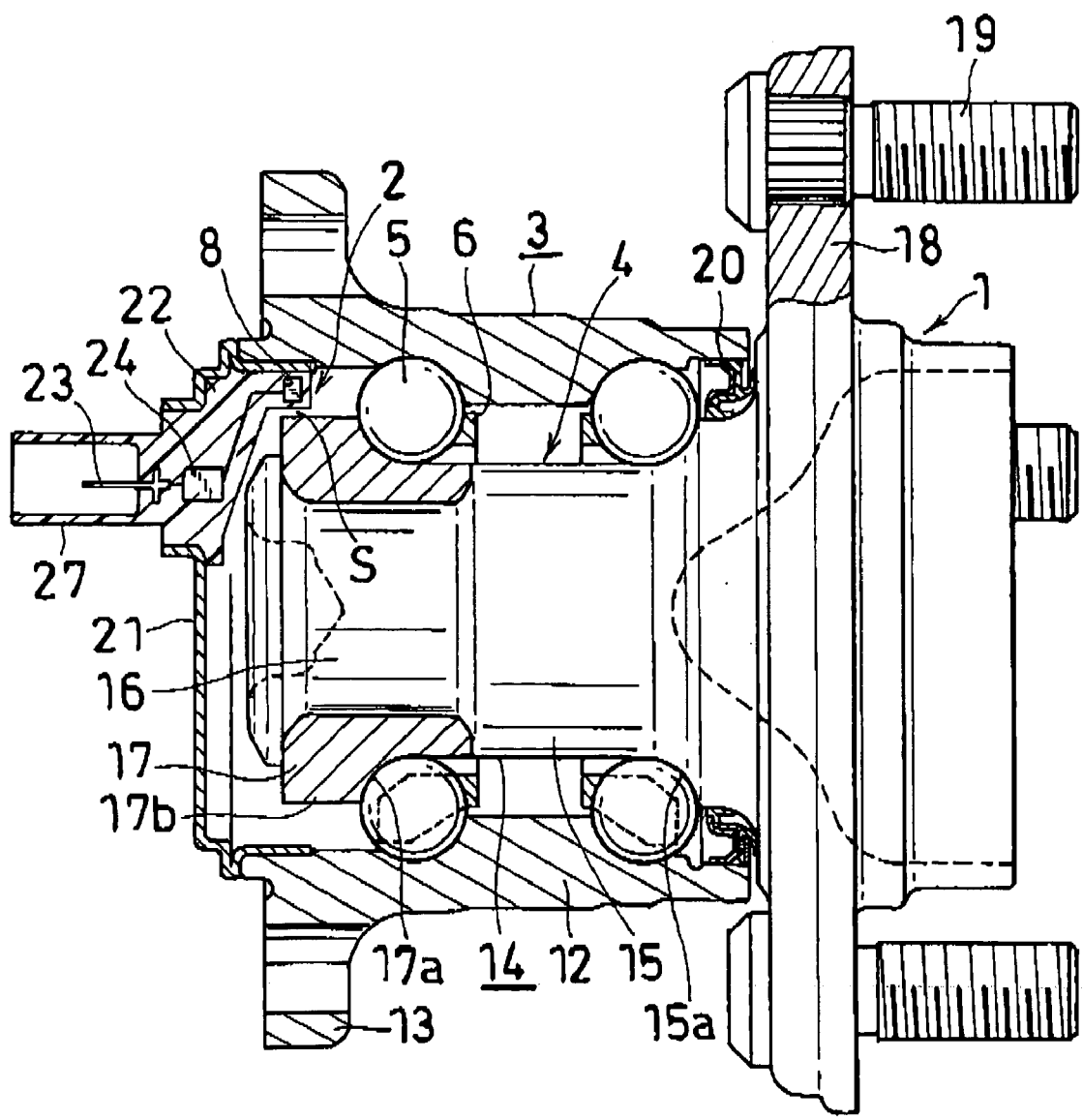
FIG. 2 is a view in vertical section showing a second embodiment of sensor-equipped antifriction bearing unit according to the invention.

The position where the magnetostrictive sensor is to be installed can be altered suitably. FIG. 2 shows a magnetostrictive sensor 8 as fixed to the inside of the cover 21 and having a sensor face opposed to the outer periphery of shoulder 17b of the inner ring 17, with a radial gap S provided therebetween. With the exception of this feature, the embodiment shown in FIG. 2 has the same construction as that of FIG. 1, and throughout these drawings, like parts are designated by like reference numerals and will not be described repeatedly.

Figure 3:
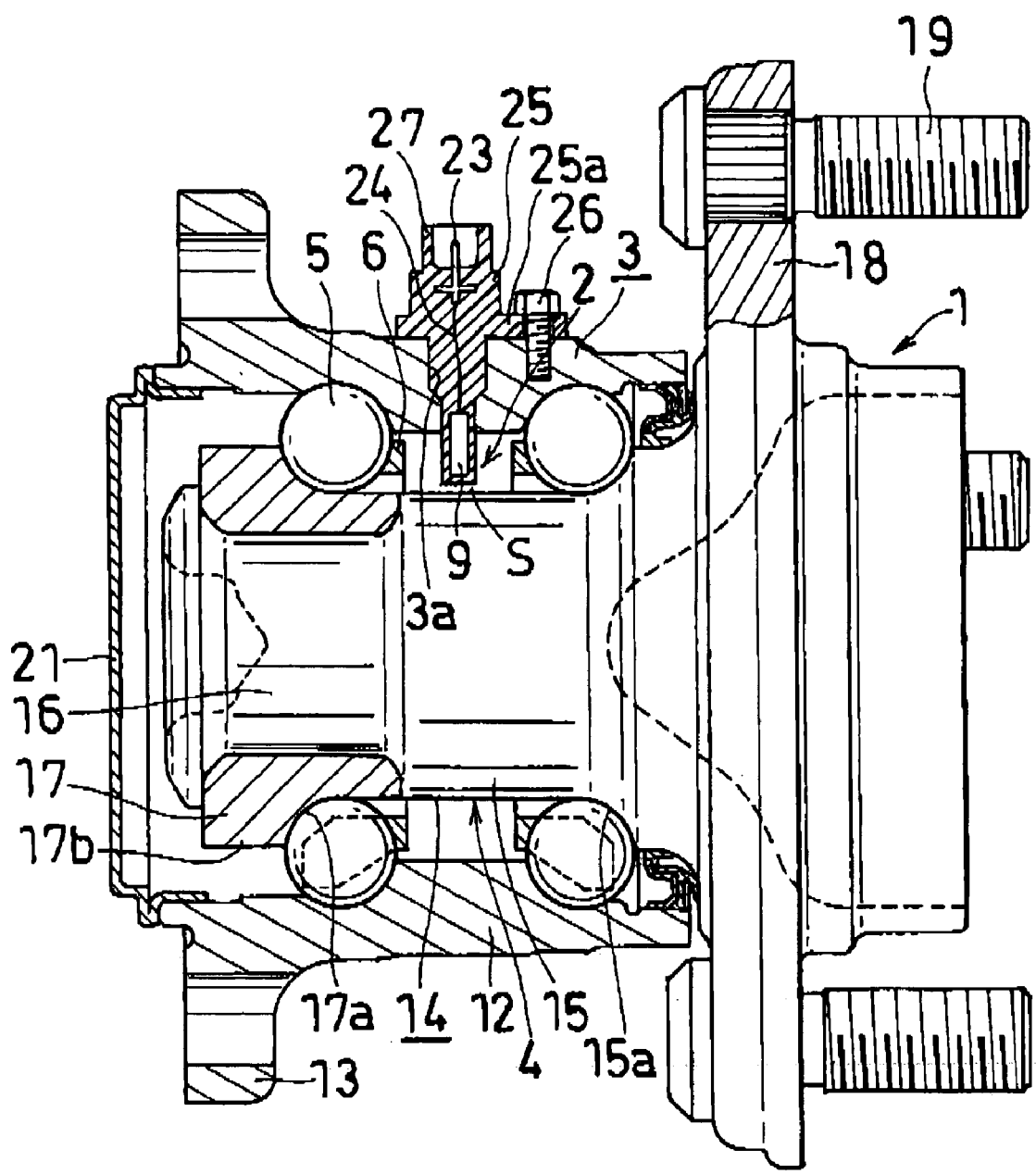
FIG. 3 is a view in vertical section showing a third embodiment of sensor-equipped antifriction bearing unit according to the invention.

FIG. 3 shows a magnetostrictive sensor 9 fixed to the axial midportion of the fixed-side raceway member 3. The sensor 9 is provided at an end thereof with a sensor face which may be opposed to the outer periphery of the large-diameter portion 15 of the inner shaft 14, with a radial gap S provided therebetween. With reference to the drawing, the sensor 9 is embedded in a resin case 25 along with an oscillation circuit by molding. The case 25 is integral with a connector portion 27 for mounting a harness for connecting the sensor device 2 to the processing means 10 provided on a vehicle body, and with a flange 25a for fastening the case 25 to the outer periphery of the fixed-side raceway member 3. A connector pin 23 for signals is provided inside the connector portion 27. The sensor 9 is connected to the connector pin 23 by a lead wire 24. The case 25 is inserted through a mount hole 3a formed in the fixed-side raceway member 3, and the flange 25a is fastened to the fixed-side raceway member 3 with a bolt 26.

The magnetostrictive sensor may be attached directly to the fixed-side raceway member 3 instead of being supported by the resin inside the cover 21 or case 25 as shown in FIG. 1, 2 or 3.

Even in the case where the magnetostrictive sensor 8 or 9 is mounted as illustrated in FIG. 2 or 3, the sensor 8 or 9 produces an output as shown in FIGS. 4 and 5, so that the speed of rotation can be determined from the output of the sensor 8 or 9.

Figure 6:
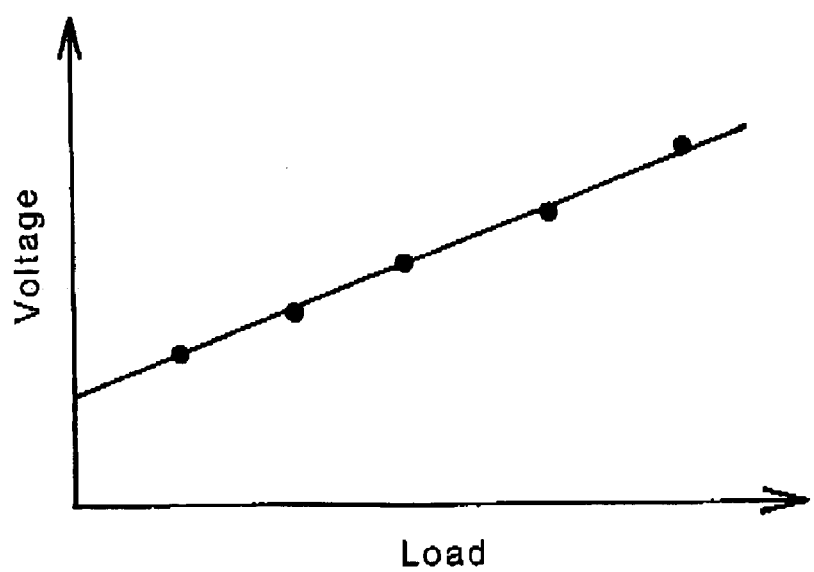
FIG. 6 is a graph showing the relationship between the output of the magnetostrictive sensor and the load.

In the case where a vehicle has the sensor-equipped antifriction bearing unit shown in any one of FIGS. 1 to 3 and when the ground contact load of the tire varies, the air gap between the magnetostrictive sensor 7, 8 or 9 on the fixed-side raceway member 3 and the rotation-side raceway member 4 varies as shown in FIG. 7. Since the air gap varies periodically as shown in FIGS. 4 and 5, the number of revolutions of the rotation-side raceway member 4 can be determined from the number of repetitions of the gap variation by the rotation detecting unit 10a of the processing means 10. On the other hand, the amplitude values of the gap are averaged by the averaging unit 10*b* of the processing means 10. As shown in FIG. 6, the averaged voltage of the sensor 7, 8 or 9 and the ground contact load are in a linear relationship. If a memory 11 has stored therein an expression representing this linear relationship, the ground contact load can be determined from the average voltage value of the sensor 7, 8 or 9 by the ground contact load calculating unit 10*c* of the processing means 10. The variations in the ground contact load obtained are fed to vehicle control means for controlling the vehicle properly.

Embodiments have been described above wherein the rotational speed of the rotation-side raceway member of the hub unit 1 is determined, whereas the rotational speed of the rotation-side raceway members of various antifriction bearings other than the hub unit can be determined based on the foregoing embodiments. The antifriction bearings usable in this case include ball bearings, roller bearings and needle bearings, while such bearings may be of the single row or double row type.

INDUSTRIAL APPLICABILITY

The invention provides a sensor-equipped antifriction bearing which is usable in place of antifriction bearings for use in various apparatus, whereby the speed of rotation can be detected by a simple construction. In the case where the present unit is used for hub units of motor vehicles, the ground contact load and the rotational speed of wheels can be determined accurately by the simple construction.

The invention claimed is:

1. A sensor-equipped antifriction bearing unit comprising:
an antifriction bearing having a fixed-side raceway member;
a rotation-side raceway member;
rolling bodies arranged between the two members; and
a sensor device provided on the antifriction bearing, wherein
the sensor device includes a magnetostrictive sensor provided on the fixed-side raceway member configured to detect at least one variation in a gap between the sensor and the rotation-side raceway member, and a processor configured to process the output of the magnetostrictive sensor, the processor comprising a rotation detecting unit configured to determine the speed of rotation of the rotation-side raceway member from the number of repetitions of at least one variation in the output of the magnetostrictive sensor, the at least one variation in the gap are due to the eccentricity of the rotation-side raceway member relative to the fixed-side raceway member.

2. A sensor-equipped antifriction bearing unit according to claim 1 wherein the processor further comprises a unit configured to average output values of the magnetostrictive sensor and a load calculating unit configured to determine the load acting on the antifriction bearing from the output averaged by the averaging unit.

3. A sensor-equipped antifriction bearing unit according to any one of claims 1 to 2 wherein the fixed-side raceway member is an outer ring having a mount portion to be fastened to a vehicle body, and the rotation-side raceway member comprises an inner shaft for a wheel to be attached thereto and an inner ring fitted around the inner shaft.

4. A sensor-equipped antifriction bearing unit according to claim 3 wherein the magnetostrictive sensor is so provided as to be opposed to an outer periphery of a crimp portion provided at an end of the inner shaft for preventing the inner ring from slipping off.

5. A sensor-equipped antifriction bearing unit according to claim 3 wherein the magnetostrictive sensor is fixed to an end portion of the fixed-side raceway member so as to be opposed to an outer periphery of the inner ring.

6. A sensor-equipped antifriction bearing unit according to claim 3 wherein the magnetostrictive sensor is fixed to the fixed-side raceway member so as to be opposed to an outer periphery of the inner shaft.

7. A sensor-equipped antifriction bearing unit according to claim 3 wherein the magnetostrictive sensor is embedded in a resin, and the resin is joined to the fixed-side raceway member or to a cover fixed to the fixed-side raceway member.

* * * * *